United States Patent [19]

Tachi

[11] 4,237,499
[45] * Dec. 2, 1980

[54] VIDEO TAPE CONTROL TIME CODE READING

[75] Inventor: Katsuichi Tachi, Kawasaki, Japan

[73] Assignee: Sony Corporation, Tokyo, Japan

[*] Notice: The portion of the term of this patent subsequent to Nov. 4, 1997, has been disclaimed.

[21] Appl. No.: 960,855

[22] Filed: Nov. 15, 1978

[30] Foreign Application Priority Data

Nov. 18, 1977 [JP] Japan .............................. 52-138757

[51] Int. Cl.² .............................................. G11B 15/52
[52] U.S. Cl. ...................................... 360/73; 360/72.2
[58] Field of Search .................... 360/14, 73, 70, 33, 360/72.1, 72.2; 358/147, 4

[56] References Cited

U.S. PATENT DOCUMENTS

| | | | |
|---|---|---|---|
| 3,681,524 | 8/1972 | Nicholls | 360/14 X |
| 3,739,086 | 6/1973 | Heather | 360/72.2 |
| 4,037,260 | 7/1977 | Busby, Jr. et al. | 360/73 |
| 4,044,389 | 8/1977 | Oldershaw et al. | 360/73 |
| 4,134,130 | 1/1979 | Tachi | 358/147 |
| 4,167,759 | 9/1979 | Tachi | 360/14 |

*Primary Examiner*—James W. Moffitt
*Assistant Examiner*—Donald McElheny, Jr.
*Attorney, Agent, or Firm*—Lewis H. Eslinger; Alvin Sinderbrand

[57] ABSTRACT

A video magnetic tape control time code reading method and apparatus enables a control time code comprising binary coded times and frame numbers to be read, independently of the direction and speed of transport of the video tape, to ascertain whether the control time code corresponds to a recorded video signal having a frame frequency of 30 or 25 frames per second. Use is made of the fact that in a 30 frame per second control time code the frame numbers always alternate regularly between odd and even, whereas in a 25 frame per second control time code the two successive frame numbers at every transition from one second to the next are either both odd or both even.

10 Claims, 6 Drawing Figures

VIDEO TAPE CONTROL TIME CODE READING

BACKGROUND OF THE INVENTION

1. Field of the Invention

The present invention relates to a video tape control time code reading method and apparatus. Embodiments of the invention may be incorporated into video tape recorders (VTRs) to enable dual-standard VTRs to be made. Such a dual-standard VTR is capable of distinguishing recorded video signals having a frame frequency of 30 frames per second, such as in the National Television System Committee (NTSC) system, and recorded video signals having a frame frequency of 25 frames per second, such as in the International Radio Consultative Committee (CCIR) system.

2. Description of the Prior Art

The editing of video tape is of substantial importance, particularly for persons concerned with the production and broadcasting of television programs. While such editing can be done by cutting and splicing the video tape, this method is extremely tedious and time-consuming, involves considerable risk of irreparably damaging the video tape, and substantially degrades the quality of signal reproduction which can be obtained from the edited video tape. So-called electronic editing is therefore now preferred. In this method signals are selectively recorded on a single video tape from more than one source, or an existing signal on a video tape is edited by erasing parts of the recorded signal and recording substitute parts derived from another source. This can be done without introducing any discontinuity into the edited recorded signal which would be noticeable upon subsequent reproduction. A critical factor in such editing is the ability to rapidly locate specific parts of a signal, most particularly individual frames. For this purpose the Society of Motion Picture and Television Engineers (SMPTE) in the United States of America and the European Broadcasting Union (EBU) in Europe have proposed respective so-called control time codes for recording on a video tape, for example, on the number 2 audio track or cue track. The SMPTE control time code will be described in detail below. The EBU control time code is very similar to the SMPTE control time code, most of the differences not being material to the present invention. The essential feature of each of the control time codes is that it comprises in binary coded form a time, which may be the time of day, expressed in hours, minutes and seconds, and within each second, individual frame numbers of the recorded video signal. In other words, each frame of the recorded video signal is uniquely identified.

These control time codes, and VTRs able to read and be controlled making use of these control time codes, enormously facilitate editing, but there is a problem, at least for professional users, that different video tapes bearing recorded signals corresponding to different systems, and in particular systems operating at different frame frequencies, need to be distinguishable to ensure appropriate decoding and correct reproduction.

SUMMARY OF THE INVENTION

One object of the present invention is to provide a video tape control time code reading method and apparatus capable of distinguishing control time codes corresponding to television systems operating at different frame frequencies.

Another object of the present invention is to provide a video tape control time code reading method and apparatus capable of identifying a control time code derived from a video tape, and in particular the frame frequency thereof, independently of the direction of transport of the video tape.

Another object of the present invention is to provide a video tape control time code reading method and apparatus capable of identifying a control time code derived from a video tape, and in particular the frame frequency thereof, whether the video tape is being transported at a normal speed as used for recording and/or reproduction, or at a higher speed used for rewinding or fast-forward transportation, or at a lower speed such as may occur during editing.

A still further object of the present invention is to provide a control time code reading method and apparatus for automatically reading a control time code and developing an output signal indicating whether the recorded video signal is a 25 or a 30 frame per second signal.

In accordance with an aspect of this invention, a video tape control time code reading method is provided for distinguishing between first and second control time codes both of which include a series of code elements. The method comprises deriving an input control time code from a video magnetic tape on which the control time code is recorded in association with a video signal, selecting predetermined ones of the code elements from the input control time code, and detecting, in dependence on said selected code elements, whether the input control time code is the first or the second control time code. In a preferred embodiment, the first control time code corresponds to a video signal having an even number of sequential frames per second, the second control time code corresponds to a video signal having an odd number of sequential frames per second and both control time codes include a code element representing the sequential number of each frame within a given second. The code elements corresponding to these frame numbers are selected from the input control time code and an even number of frames per second are indicated if the selected code elements follow a regular sequence of alternation between odd and even numbers and an odd number of frames per second are indicated if they do not.

In accordance with another aspect of this invention, a video tape control time code reading apparatus is provided for distinguishing between first and second control time codes, both of which control time codes have a series of code elements recorded on a video tape. The apparatus comprises an input means to which a control time code is supplied, selecting means for selecting predetermined code elements from the input control time code, and detecting means operative in dependence on the selected code elements to distinguish whether the input control time code is the first or second control time code. According to a preferred embodiment, the first control time code corresponds to a video signal having an even number of sequential frames per second, the second control time code corresponds to a video signal having an odd number of sequential frames per second, and both control time codes include a code element corresponding to the sequential number of each frame within a given second. The selecting means selects the code elements corresponding to frame numbers and the detecting means detects whether or not the frame numbers in the input control time code follow a regular sequence of alternate odd and even numbers, indicating an even number of frames per second if such a regular sequence is detected and an odd number of frames per second if not.

An aspect of this invention makes use of the fact that, in a recorded signal in which there is an even number of frames per second, for example 30, the frame numbers always alternate odd and even, and this is true whether the frames are numbered from 00 to 29 or 1 to 30. It should perhaps be emphasised that this odd-even alternation of the frame numbers is present in an NTSC color signal in which the actual frame frequency is approximately 29.97 frames per second, and in consequence certain frame numbers have to be dropped. It is a feature of such frame dropping, that it is done without disturbing the odd-even alternation of the frame numbers. On the other hand, in a recorded signal having an odd number of frames per second, for example 25, there is a periodic irregularity in the otherwise regular odd-even alternation of the frame numbers, and again this is true whether the frames are numbered 00 to 24 or 1 to 25. The irregularity occurs, of course, between frame numbers 24 and 00 (both being even) or between frame numbers 25 and 1 (both being odd).

The above, and other objects, features and advantages of this invention will be apparent from the following detailed description of an illustrative embodiment which is to be read in connection with the accompanying drawings.

DETAILED DESCRIPTION OF A PREFERRED EMBODIMENT

Before describing the embodiment, it is necessary for an understanding of the invention to describe a control time code. For this purpose the SMPTE control time code for a single frame and small parts of the two adjacent frames is shown in diagrammatic form in FIG. 1, to which reference is now made. For each frame the control time code comprises 80 bits, bits 0 to 63 providing the time and frame code elements and also spare bits for the user to make use of if required, and bits 64 to 79 comprising a sync word. Each bit is a binary bit and the control time code is recorded as a phase-modulated serial code, usually referred to as a biphase mark. The control time code is self-contained and self-clocking, is immune to 180° phase reversals and is a square wave, so it can be recorded using a saturated or unsaturated method.

Figure 1:
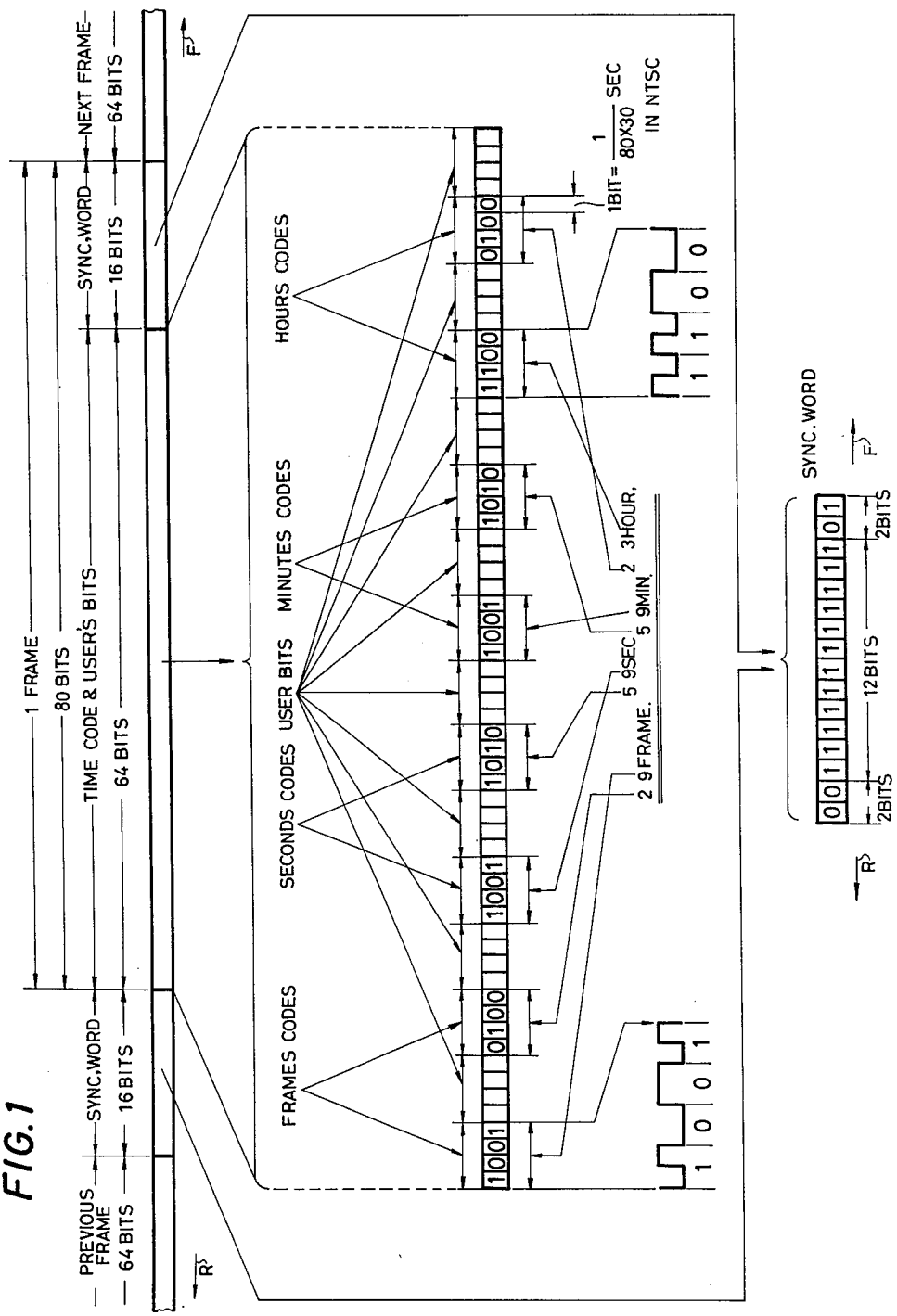
FIG. 1 shows in diagrammatic form an SMPTE control time code corresponding to one frame of a recorded video signal.

Each sync word is the same and is as shown at the bottom of FIG. 1. This 16-bit pattern is unique, in the sense that it cannot occur elsewhere in the control time code, and it provides both an indication as to the direction in which the video tape is being transported, that is to say in the forward or reverse direction of transport (marked F and R in FIG. 1), and also identifies the 80 bits corresponding to a frame, so that the 64 bits providing the time and frame code elements can be extracted for processing.

The 64 bits providing the time and frame codes include, as shown from the right in FIG. 1, 4 bits for tens of hours, 4 bits for units of hours, 4 bits for tens of minutes, 4 bits for units of minutes, 4 bits for tens of seconds, 4 bits for units of seconds, 4 bits for tens of frames and 4 bits for units of frames. Each of these groups of 4 bits is preceded by a respective group of 4 bits which the user can use for his own purposes if required. In the example shown, the binary digits indicated show that the particular frame is at 23 hours, 59 minutes, 59 seconds and is frame number 29 within that second. There are some further refinements to the SMPTE control time code, but as these are not material to the present invention, they are not referred to here. Full details can be found in the Journal of the SMPTE Vol. 79, Dec. 1970, pp. 1086 to 1088.

The EBU control time code is very similar, the differences in form and content between it and the SMPTE code not being significant to the present invention, except as concerns frame frequency. Thus the SMPTE control time code is normally used for video signals with a frame frequency of 30 frames per second and the EBU control time code is normally used for video signals with a frame frequency of 25 frames per second. The different frame frequency results in a different bit frequency in the control time code, but the difference is only in the ratio 6:5, so is difficult to detect. Moreover, the difference can only be detected when the video tape is being transported at a known speed, which is not the case in fast forward or rewind operation.

When using a VTR, each frame, or alternatively each field of a video signal is recorded in a respective track of a video magnetic tape, the tracks being disposed obliquely relative to the direction of transportation of the video tape, and in recording and reproduction of a rotary magnetic head arrangement scans the video tape. During reproduction, the scanning is under the control of a control signal which is derived from a control signal track running lengthwise along the video tape. The video tape also carries at least a number 1 and a number 2 or cue audio tracks, also running lengthwise along the video tape. The control time code may be recorded in the number 2 audio track or in the vertical blanking intervals of the video signal.

An embodiment of the invention will now be described with reference to FIG. 2. In this embodiment the control time code is derived from a video tape, the direction of tape transportation is determined from the sync word contained in the control time code, and the 64 bits providing the time and frame codes are extracted from the control time code. This embodiment make use of the fact that in recorded video signals in which the frame frequency is 30 frames per second, the frame numbers always alternate odd and even, and this is true whether the frames are number 00 to 29 or 1 to 30. In the following description it will be assumed that they are numbered 00 to 29, as is the usual practice. On the other hand, in a recorded video signal having a frame frequency of 25 frames per second, there is a periodic irregularity in the otherwise regular odd-even alternation of the frame numbers, and again this is true whether the frames are numbered 00 to 24 or 1 to 25. In the following description it will be assumed that they are numbered 00 to 24, as is the usual practice.

Detection based on the frame numbers can therefore be done independently of the direction of tape transport and of the speed of tape transport, and moreover no modification of the control time code is required to enable the frame frequency to be detected.

Figure 2:
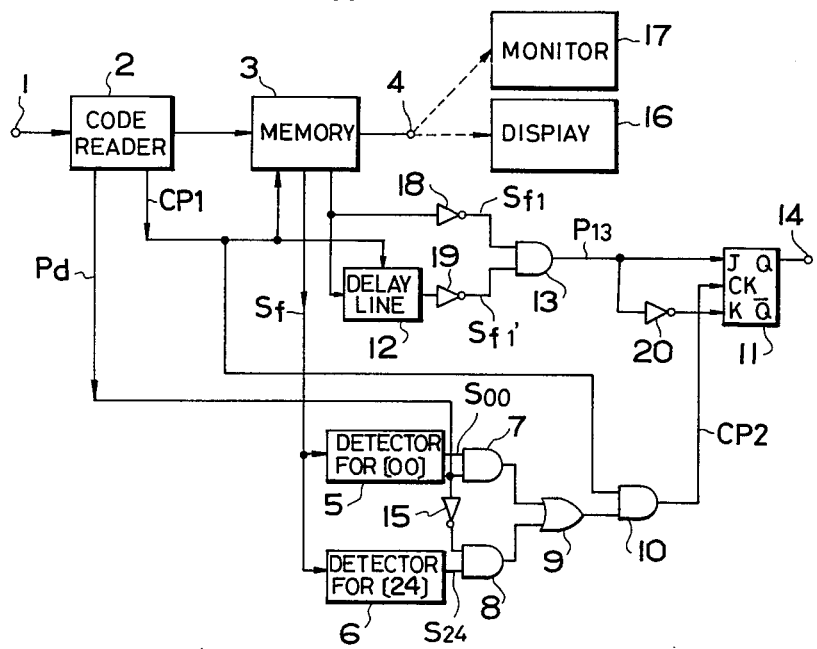
FIG. 2 shows in block diagrammatic form an embodiment of video tape control time code reading apparatus according to the present invention.

In the embodiment shown in FIG. 2 the control time code derived from a video tape (not shown) is supplied to an input terminal 1 connected to a code reader 2, or alternatively the code reader 2 can extract the control time code from a complete reproduced signal derived from the video tape and supplied to the input terminal 1. From this input control time code, the code reader 2 detects the direction of tape transport from the sync word, and in dependence thereon supplies a signal Pd which is of high level "1" for the forward direction and of low level "0" for the reverse direction. The signal Pd is supplied to one input of an AND gate 7, and via an inverter 15 to one input of an AND gate 8. The signal Pd may provide a visual indication of the tape transport direction.

The code reader 2 also develops a clock pulse signal CP1 synchronised to the frame frequency of the control time code, and supplies the clock signal CP1 to a memory 3, a delay means 12 and one input of a AND gate 10. The code reader 2 also extracts the 64 bits providing the time and frame codes and supplies them to the memory 3 for storage.

The memory 3 supplies data to the output 4 comprising the time and frame codes in parallel form. A display means 16 or a television picture monitor 17 may be connected to the output 4, the display means 16 or the monitor 17, if provided, incorporating decoding means to decode the time and frame codes and provide a visual display of the time and frame number either alone or in association with a television picture, respectively.

The memory 3 also selects from the input control time code a frame code signal Sf of 8 bits comprising 4 bits for the tens of frames and 4 bits for the units of frames, which is supplied to respective frame code detectors 5 and 6. The detector 5 supplies an output signal S00 which is "1" when the frame code signal Sf represents the the frame 00, and is "0" at all other times. Likewise the detector 6 supplies an output signal S24 which is "1" when the frame code signal Sf represents frame 24 and is "0" at all other times. The outputs of the detectors 5 and 6 are supplied to the second inputs of the AND gates 7 and 8, respectively, and the outputs of the AND gates 7 and 8 are connected to the two inputs respectively of an OR gate 9, the output of which is connected to the second input of the AND gate 10. The output of the AND gate 10 supplies a signal CP2, which is in fact a gated clock pulse signal, this signal CP2 being supplied to the clock input of a JK flip-flop 11.

The memory 3 also selects the code element representing the unit value of the current frame number and generates an alternating signal.

This signal has a first level when the units value of the current frame number is even and a second level when that units value is odd. This alternating signal is supplied to the delay means 12, and also to an inverter 18. The delay means 12 operates to delay the signal supplied thereto by one frame period under the control of the clock signal CP1. The output of the delay means 12 is connected to a further inverter 19. Output signals Sf1 and Sf1' supplied by the inverters 18 and 19 are supplied to the two inputs respectively of an AND gate 13, the output signal P13 from which is supplied directly to the J input of the flip-flop 11, and by way of an inverter 20 to the K input of the flip-flop 11. Inverters 18 and 19, delay means 12, and AND gate 13 provide means for detecting whether or not the alternating signal from memory 3 alternates levels in successive frame periods.

The output signal of the embodiment is derived from an output terminal 14 connected to the Q output of the flip-flop 11, and for reasons which will be explained below this output signal is "0" when the input control time code corresponds to a frame frequency of 30 frames per second and is "1" when the input control time code corresponds to a frame frequency of 25 frames per second. This output signal can therefore be used to provide an indication and/or effect a control, for example in a dual-standard VTR. In particular, in a dual-standard VTR, the output signal can be used to ensure reproduction of a recorded video signal at the appropriate frame frequency, and on the assumption that a recorded signal with a frame frequency of 30 frames per second in an NTSC system signal, and a recorded signal with a frame frequency of 25 per second is a CCIR system signal, can condition the VTR to effect appropriate decoding.

The way in which the embodiment derives the appropriate output signal will now be explained in more detail. Reference will first be made to FIGS. 3A to 3G which show waveforms that will be derived when the control time code supplied to the input terminal 1 is an SMPTE control time code associated with a video signal having a frame frequency of 30 frames per second. Moreover, these waveforms correspond to the case where the tape transportation direction is forward.

Figure 3:
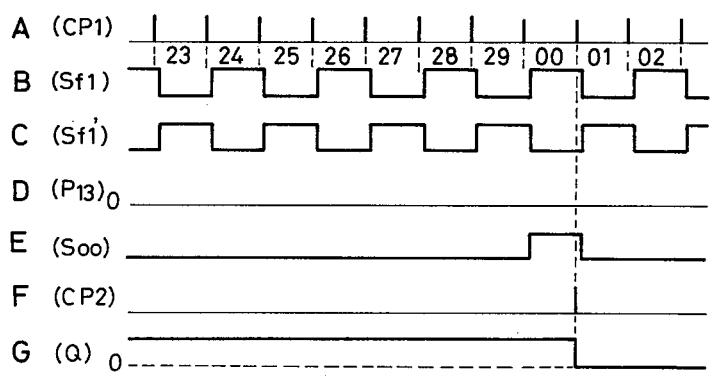
FIGS. 3A to 3G, 4A to 4G, 5A to 5G and 6A to 6G show respective waveforms used in describing the operation of the embodiment of FIG. 2.

FIG. 3A shows the clock signal CP1 which is derived by the code reader 2 and comprises short pulses with a repetition frequency synchronised with the frame frequency of the control time code. The precise value of this frequency will of course vary depending on the speed at which the video tape is being transported.

Considering now, for example, the sequence of frames 23,24,25, the corresponding frame codes will be 00100011, 00100100, 00100101, and it will be noted that the final digit alternates between 1 and 0. This will continue over the transition to the next second, where the sequence of frames continues 26, 27, 28, 29, 00, 01. By operation of the delay means 12, which delays by one frame period, and the inverters 18 and 19, the signals Sf1 and Sf1' as shown in FIGS. 3B and 3C are derived and supplied to the AND gate 13. So long as the alternating sequence of odd-even frame codes is maintained therefore, the signal P13 supplied by the AND gate 13 will remain "0" as indicated by FIG. 3D.

While the frame code for the frame 00 is supplied to the detector 5, the output signal S00 thereof will change from "0" to "1" as indicated by FIG. 3E. As the video tape is moving forward, the signal Pd will be "1", so the AND gate 7 is enabled, but not the AND gate 8. The pulse in the signal S00 will therefore pass the AND gate 7 and the OR gate 9, and at the AND gate 10 will act as a gating pulse to allow one short pulse from the clock signal CP1 to pass to form the signal CP2 indicated in FIG. 3F. Supply of this short pulse to the flip-flop 11 causes the output signal developed at the Q output of the flip-flop 11 to become "0" as indicated in FIG. 3G, or, alternatively, if it was already "0", to remain "0". This indicates 30 frames per second.

Reference will next be made to FIGS. 4A to 4G which show waveforms that will be developed when the control time codes supplied to the input terminal 1 is an EBU control time code associated with a video signal having a frame frquency of 25 frames per second.

Moreover, these waveforms correspond to the case where the tape transport direction is forward.

Figure 4:
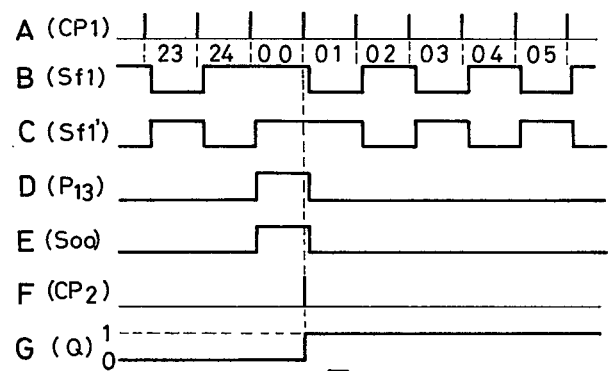

FIG. 4A shows the clock signal CP1 as before.

Considering now the sequence of frames 23, 24, 00, 01, it will be seen that the signals Sf1 and Sf1' shown in FIGS. 4B and 4C each have an irregularity, and do not alternate regularly as did the corresponding signals shown in FIGS. 3B and 3C. This irregularity arises because of the two successive frames both having even numbers, these being the frames 24 and 00. In consequence of this, the signal P13 comprises a pulse as shown in FIG. 4D, this pulse coinciding in time with the pulse in the signal S00 at the time of the frame 00. As previously described, this latter pulse will act as a gating pulse at the AND gate 10, and a short pulse from the clock signal CP1 will pass the AND gate 10 to form the signal CP2 as shown in FIG. 4F. Supply of this short pulse to the flip-flop 11 in coincidence with the pulse in the signal P13 causes the output signal developed at the Q output of the flip-flop 11 to become "1" as indicated in FIG. 3G, or, alternatively, if it was already "1", to remain "1". This indicates 25 frames per second.

There is no reason why the embodiment described should not provide the correct output at the output terminal 14 from the very first transition from one second to the next, but as the operation described above will be repeated at every such transition, any failure to provide the correct output at the first transition will very quickly be rectified. It will also be noticed that if the flip-flop 11 is already in the appropriate condition or from the time when it first assumes the appropriate condition, no further switching of the flip-flop 11 occurs, and the output signal remains steady at "1" or "0" as appropriate.

It is now necessary to consider the operation in cases where the video tape is being transported in the other direction.

Reference will first be made to FIGS. 5A to 5G which show waveforms that will be developed when the control time code supplied to the input terminal 1 is an SMPTE control time code associated with a video signal having a frame frequency of 30 frames per second, the tape transport direction being reverse.

The signals CP1, Sf1, Sf1' and P13, having the waveforms shown in FIGS. 5A, 5B, 5C and 5D are generally the same as described above with reference to FIGS. 3A to 3D, the main point being the regular alternation of the signals Sf1 and Sf1'. As, however, the tape transport direction is reverse, the signal Pd will be "0", so that the AND gate 8 will be enabled and the AND gate 7 will not.

Figure 5:
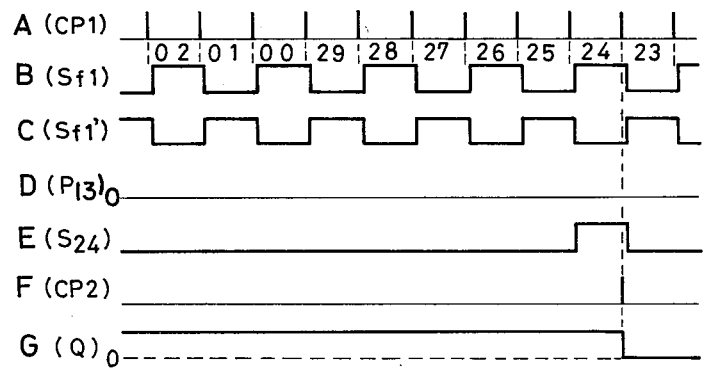

While the frame code for the frame 24 is supplied to the detector 6, the output signal S24 thereof will change from "0" to "1" as indicated by FIG. 5E. As the AND gate 8 is enabled, the pulse in the signal S24 will pass the AND gate 8 and the OR gate 9, and at the AND gate 10 this pulse acts as a gating pulse to allow one short pulse from the clock signal CP1 to pass to form the signal CP2 indicated in FIG. 5F. Supply of this short pulse to the flip-flop 11 causes the output signal developed at the Q output of the flip-flop 11 to become "0", as indicated in FIG. 5G or, if it was already "0", to remain "0". This indicates 30 frames per second, just as in the case when the tape transport direction was forward.

Finally reference will be made to FIGS. 6A to 6G which show waveforms that will be developed when the control time code supplied to the input terminal 1 is an EBU control time code associated with a video signal having a frame frequency of 25 frames per second, the tape transport direction being reverse.

The signals CP1, Sf1, Sf1' and P13, having the waveforms shown in FIGS. 6A, 6B, 6C and 6D are generally the same as described above with reference to FIGS. 4A to 4D, the main point being the irregularity which occurs in the alternation of the signals SF1 and SF1' at the transition from one second to the next, where two successive frames have even numbers. Moreover, as the tape transport direction is reverse, the signal Pd will be "0", so that the AND gate 8 will be enabled and the AND gate 7 will not.

Figure 6:
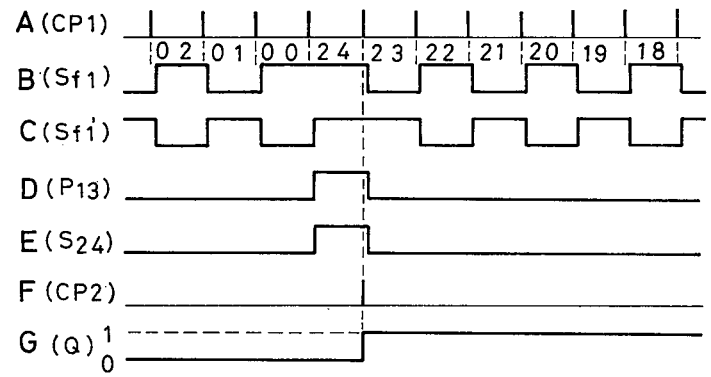

While the frame code for the frame 24 is supplied to the detector 6, the output signal S24 thereof will change from "0" to "1" as indicated by FIG. 6E. As the AND gate 8 is enabled, the pulse in the signal S24 will pass the AND gate 8 and the OR gate 9, and at the AND gate 10 this pulse acts as a gating pulse to allow one short pulse from the clock signal CP1 to pass to form the signal CP2 indicated in FIG. 6F. Supply of this short pulse to the flip-flop 11 in coincidence with the pulse in the signal P13 causes the output signal developed at the Q output of the flip-flop 11 to become "1" as indicated in FIG. 6G, or, alternatively, if it was already "1", to remain "1". This indicates 25 frames per second, just as in the case where the tape transport direction was forward.

Although an illustrative embodiment of the invention has been described in detail herein with reference to the accompanying drawings, it is to be understood that the invention is not limited to this precise embodiment, and that various changes and modifications can be effected therein by one skilled in the art without departing from the scope and spirit of the invention as defined by the appended claims.

For example, although the embodiment has been described as including the memory 3, this is no more than a convenient means of storing the control time code and extracting the required parts from it. Obviously such extraction can be carried out without the need to store the control time code.

I claim:

1. A method for distinguishing between at least first and second control time codes reproduced from a video tape which contains frames of video recorded thereon, said first control time code including at least first repeating sequences of contiguous frame codes identifying an odd number of individual frames of said video, said second control time code including at least second repeating sequences of contiguous frame codes identifying an even number of individual frames of said video, comprising the steps of:
   producing a first signal responsive to a reproduced frame code identifying an even frame number;
   comparing said first signal with a second signal produced responsive to an immediately preceding frame code identifying an even frame number; and
   producing a first output signal when the comparing step indicates that said first signal and said second signal both identify the same condition of oddness or evenness.

2. A method according to claim 1, further comprising the steps of:
   sensing one of a lowest value and a highest value of one of said odd number and said even number of individual frames; and
   performing the step of producing a first output signal in response to the sensing step.

3. A method according to claim 2, wherein said video tape is selectively transported in a forward tape transport direction and a reverse tape transport direction and said sensing step further includes sensing said highest value in response to said forward tape transport direction and sensing said lowest value in response to said reverse tape transport direction.

4. A method according to claim 1, wherein said even number is 30 and said odd number is 25.

5. A video tape apparatus for distinguishing between at least first and second control time codes reproduced from a video tape which contains frames of video recorded thereon, said first control time code including at least first repeating sequences of frame codes identifying contiguous frame numbers of an odd number of individual frames of said video, said second control time code including at least second repeating sequences of frame codes identifying contiguous frame numbers of an even number of frames of said video, comprising:

means for detecting whether a frame number is even or odd;

means for detecting whether an immediately preceding frame number is even or odd; and means for producing a first output signal indicative of said first control time code if said frame number and said immediately preceding frame number are either both odd or both even and for producing a second output signal if said one of said frame number and said immediately preceding frame number is even and the other thereof is odd.

6. An apparatus according to claim 5, wherein said video tape has at least a forward direction of tape transport and said frame numbers repeatedly increase from a minimum to a maximum value during said forward direction of tape transport, and the apparatus further includes means for performing the production of one of said first and second output signals in coincidence with said minimum value of said first repeating sequences.

7. An apparatus according to claim 6, wherein said video tape also has a reverse direction of tape transport and said frame numbers repeatedly decrease from said maximum to said minimum value during said reverse direction of tape transport, and said means for performing is further operative during tape transport in the reverse direction for producing one of said first and second output signals in coincidence with said maximum value of said first repeating sequences.

8. An apparatus according to claim 5, further comprising a memory for receiving at least a portion of one of said first and second time codes corresponding to one of said frames of said video, and means for extracting said frame numbers from said memory.

9. An apparatus according to claim 8, wherein said video tape has a forward and a reverse tape transport direction and said memory includes means responsive to said portion stored therein for distinguishing said forward and reverse tape transport directions and for producing a direction signal indicating the direction of tape transport.

10. A video tape apparatus for distinguishing between a first time code related to a video signal having an odd number of sequentially repeating contiguous frame numbers corresponding respectively to frames of video signals having first and second different frame frequencies and a second time code related to a video signal having an even number of sequentially repeating contiguous frame numbers, comprising:

means for detecting that a contiguous pair of said frame numbers are either both odd and both even; and means for producing an output signal in response to such detection indicative of said first time code.

* * * * *